United States Patent [19]
Goodwin

[11] 3,758,234
[45] Sept. 11, 1973

[54] FIBER BLADE WITH LEADING EDGE REINFORCEMENT

[75] Inventor: John R. Goodwin, Ockbrook, England

[73] Assignee: The Secretary of State for Defence, London, England

[22] Filed: May 5, 1972

[21] Appl. No.: 250,744

Related U.S. Application Data

[63] Continuation of Ser. No. 867,653, Oct. 20, 1969, abandoned.

[30] Foreign Application Priority Data
Oct. 22, 1968 Great Britain.................. 50,058/68

[52] U.S. Cl..................... 416/230, 416/241, 29/191
[51] Int. Cl............................................. F01d 5/14
[58] Field of Search................. 416/224, 229, 230, 416/241, 241 A; 29/191

[56] References Cited
UNITED STATES PATENTS
3,176,775  4/1965  Clemens ............................ 416/230
3,294,366  12/1966  Coplin ............................... 416/224

Primary Examiner—L. Dewayne Rutledge
Assistant Examiner—M. J. Andrews
Attorney—Cushman, Darky & Cushman and Lloyd J. Street

[57] ABSTRACT

This invention concerns a leading edge reinforcement for a fiber reinforced blade suitable for use in a gas turbine engine. The reinforcement comprises two strips of metal joined together at and adjacent to an edge which is shaped to form the leading edge of the blade. At least a part of the remaining portion of the metal strip serves for the attachment of the reinforcement to the blade.

3 Claims, 4 Drawing Figures

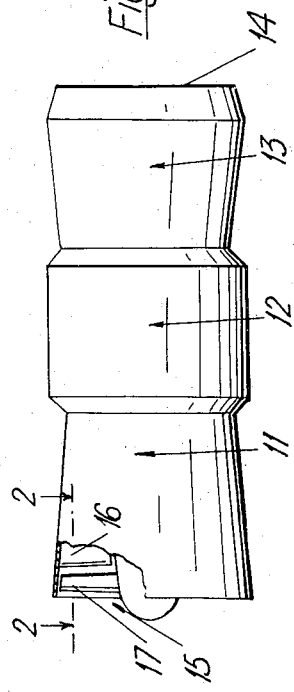
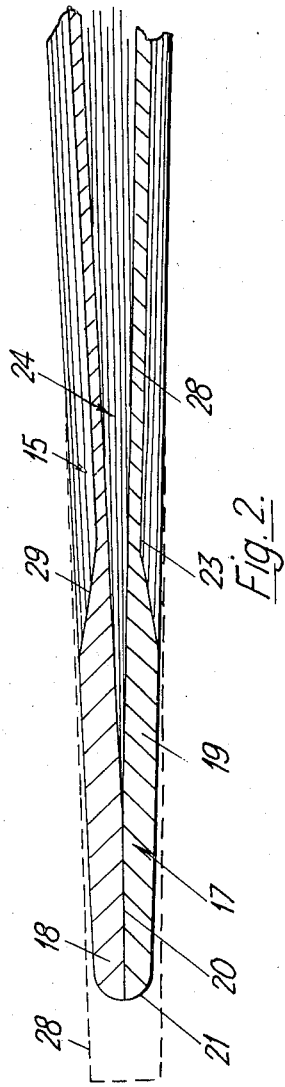

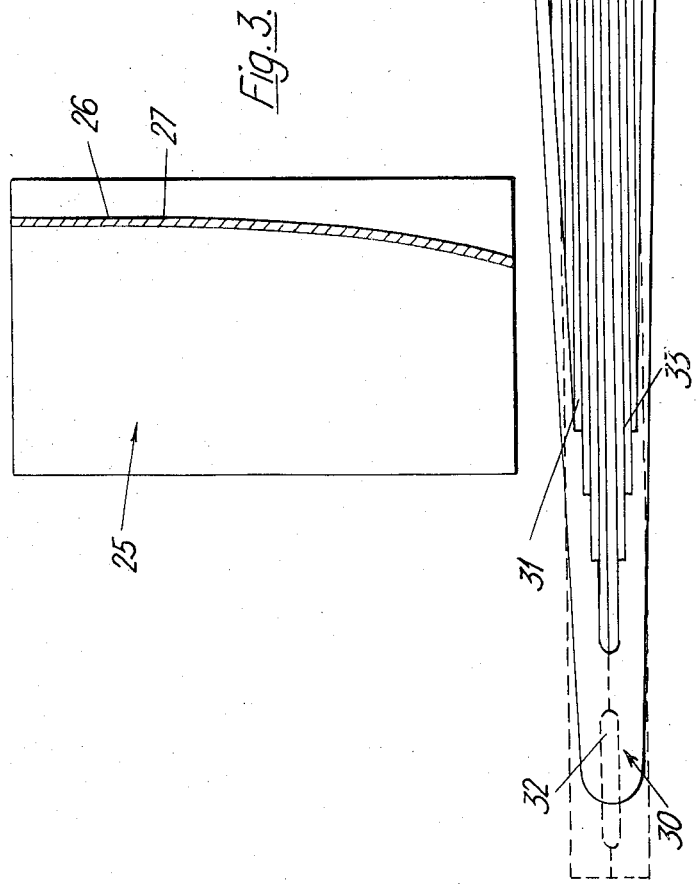

FIBER BLADE WITH LEADING EDGE REINFORCEMENT

This application is a continuation of my earlier application, Ser. No. 867,653, filed Oct. 20, 1969 and now abandoned.

This invention relates to a blade reinforcement and is particularly concerned with a reinforcement for a blade of a gas turbine engine.

According to the present invention a leading edge reinforcement for the aerofoil section of a fibre reinforced blade or vane comprises two sheets or strips of metal joined together at and adjacent an edge which is shaped to form the leading edge of the blade, the portion of the strips or sheets opposite said edge serving for attachment of the reinforcements to said aerofoil section.

Preferably said sheets are joined together over a strip of surface extending parallel to and including said leading edge.

Said joint may be a seam weld, an electron beam weld or a brazed joint or a glued joint.

Said remaining portion of the strips may be of thinner section than the leading edge portion of the strips.

According to another aspect of the invention a method of manufacturing the leading edge reinforcement for a fibre reinforced blade comprises the steps of cutting two sheets of metal to form strips having a desired leading edge curve, if necessary machining the portions of the strips distant from the leading edge to facilitate attachment thereof to a blade, joining the strips together at and adjacent the leading edge, and machining the leading edge portion of the strips to form the desired portion of the aerodynamic profile of the blade.

Said machining preferably comprises chemical machining.

According to a further aspect of the invention a method of manufacturing a blade comprises the steps of manufacturing a leading edge reinforcement according to the preceding paragraphs, laying up sheets of fibre reinforced material to form a blade core, trapping said blade core between said strips, and further laying up sheets of fibre reinforced material on the outside of said strips to form the remainder of the blade.

The invention also comprises a blade having a leading edge reinforcement according to the preceding paragraphs.

The invention will now be particularly described merely by way of example with reference to the accompanying drawings in which FIG. 1 is a partly broken away elevation of a gas turbine engine incorporating blades having reinforcements according to the invention, FIG. 2 is an enlarged section of the leading edge of a blade of the engine of FIG. 1 and according to the invention, FIG. 3 shows a method of assembing a reinforcement according to the invention, and FIG. 4 is a view similar to FIG. 2 but of a further embodiment.

Referring first to FIG. 1, a gas turbine engine is generally indicated at 10 and comprises a compressor section 11, a combustion section 12, a turbine section 13 and a final nozzle 14 all in flow series. The casing of the engine is broken away at the forward end of the compressor section 11 to show a first stage of rotor blades 15 and a first stage of stator blades 16.

It will be appreciated that since the rotor blades 15 are the first obstruction which is met by air sucked into the engine, they will also be prone to damage by bird and other foreign object ingestion. In the interests of lightness the blades 15 may be made of fibre reinforced composite material; in this case they may be relatively easily damaged by foreign body ingestion. They are therefore provided with a leading edge reinforcement which can be seen at 17 in FIG. 1 and which is more easily visible from FIG. 2 which is a section on one of the blades 15 showing only the leading edge portion.

The leading edge reinforcement 17 comprises two strips of metal 18 and 19 which are joined together at 20 at and adjacent the leading edge 21.

The remaining portion of the strips 18 and 19 is formed to produce a thinner section as can be seen at 22 and 23. The thin sections 22 and 23 are interlaminated with the laminations generally indicated at 24 which in this particular instance comprises layers of carbon fibre reinforced resin with which are interposed some layers of steel.

It will therefore be seen that the leading edge reinforcement 17 provides a rigid metal leading edge for the blade which is strongly attached to the composite material forming the remainder of the aerofoil section of the blade. Further detail of the construction is explained more fully below with reference to the method of manufacturing and assembling the reinforcement and blade.

To manufacture the reinforcement 17 a pair of sheets of metal, which may be of substantially rectangular shape as shown at 25 in FIG. 3, are cut adjacent one edge to form a shape corresponding to the curve of the leading edge of the desired blade shape. This curve is shown at 26 on the sheet 25 of FIG. 3. The portions 22 and 23 of the sheets are then machined so as to reduce their thickness; chemical machining is preferably used. These two sheets are then laid one on top of the other so that their leading edges correspond, and a strip adjacent the leading edge welded, brazed or glued together. This joining strip is shown hatched at 27. It should be noted that although electron beam welding could be used to join the pieces, we in fact prefer to use seam welding, the beam being directed between the sheets and caused to oscillate so as to produce a reasonable section of welding.

The joined sheets are then pressed or otherwise formed to correspond to the twist and camber of the required blade section (it should be noted that it would be possible to effect this forming operation before the sheets are joined together). The reinforcement thus formed has a leading edge which is of rectangular cross-section as in fact is shown in chain lines at 28 in FIG. 2, and the portions of the sheets distant from the leading edge are of the same thickness as the portions at the leading edge. The reinforcement is next machined to taper the leading edge portion and to round off the leading edge itself.

To assemble the reinforcement 17 to the blade the following technique is used. A blade core is manufactured by the laying up of laminations of fibre reinforced material, and if desired interlaminations of steel or titanium sheets may be included. This core is shown at 28 in FIG. 2. The reinforcement 17 is then pushed on to the core 28 so that the portions 22 and 23 trap the core between themselves. It may be desirable to separate the portions 22 and 23 in the forming operation; otherwise the nip between the portions 22 and 23 may be used to hold the reinforcement on the core 28.

Further laminations of the fibre reinforced material are then laid up on the assembled reinforcement and core until the laminations match up with the core leading edge as can be seen at 29. The completed blade and reinforcement may then be cured and if necessary an anti-erosion coating may be applied to those areas where the fibre reinforced material forms the external surface of the blade.

FIG. 4 shows a second embodiment. In this case the reinforcement 30 is made by cutting two sheets as in the FIG. 2 embodiment, forming the sheets to the desired blade camber and twist, and chemically eroding the portions of the sheets distant from the leading edge so as to thin this portion out in a series of steps as shown at 31. The sheets are then placed together and seam welded along the leading edge to form a weld slug as shown at 32. The leading edge is next machined from the form shown in chain-lines in FIG. 4 to its final aerodynamic shape.

The reinforcement 30 is again assembled to the blade core 33 and the complete blade is cured, but in this case the reinforcement extends along both flanks of the blade forming at least part of the surface thereof. In fact the portion lying on the pressure side of the blade may extend to the trailing edge of the blade.

It will be appreciated that this latter construction provides some further advantages. The stepped portions 31 form a good key for attachment of the fibre reinforced material to the reinforcement, and the steps may be chosen to be of thickness equal to that of the laminations of the fibre reinforced material to ensure good matching of the core and the reinforcement. The portions of the reinforcement form an anti-erosion coating for the blade, and additionally the reinforcement forms a torsional stiffener for the blade itself by virtue of its cross-sectional shape.

It will be appreciated that a number of modifications can be made to the above embodiment. Thus a number of materials are suitable for the manufacture of the leading edge reinforcement 17 although we prefer steel or titanium. Again the sequence of machining operations is susceptible to re-arrangement; thus it would be possible to form the sheets before or after welding and one could crop the sheets either before or after the sheets are joined together. Although chemical machining is preferred for the shaping of the reinforcement sheets, it would of course be possible to use electro chemical machining or even conventional metal removal techniques.

What we claim is:

1. In combination with a fiber reinforced gas turbine blade having a leading edge, a fiber aerofoil section and a trailing edge, an edge reinforcement for reinforcing the leading upstream edge of said fiber reinforced gas turbine blade, said reinforcement comprising:
   first and second strips of metal, each strip having a first section with a first thickness and a second section with a second thickness thinner than said first thickness,
   said first and second strips being joined along at least a portion of said first sections adjacent the leading edge of said blade, and
   said second thinner sections of said first and second strips extending into the fiber aerofoil section for strongly attaching said strips thereto.

2. The combination of claim 1, wherein the first section of said first and second strips are joined together forming the outer surface of the leading edge of said blade.

3. The combination of claim 1, in which fiber reinforced material is provided on the outside of said blade, covering at least a portion of said thinner sections of said first and second strips.

* * * * *